United States Patent
Korbin

(10) Patent No.: US 9,215,951 B2
(45) Date of Patent: Dec. 22, 2015

(54) TOASTER WITH INDEPENDENTLY CONTROLLABLE HEATING ELEMENTS

(71) Applicant: William S. Korbin, Carlsbad, CA (US)

(72) Inventor: William S. Korbin, Carlsbad, CA (US)

( * ) Notice: Subject to any disclaimer, the term of this patent is extended or adjusted under 35 U.S.C. 154(b) by 352 days.

(21) Appl. No.: 13/712,935

(22) Filed: Dec. 12, 2012

(65) Prior Publication Data

US 2014/0157996 A1  Jun. 12, 2014

Related U.S. Application Data

(60) Provisional application No. 61/630,379, filed on Dec. 12, 2011.

(51) Int. Cl.
*A47J 37/08* (2006.01)

(52) U.S. Cl.
CPC .................. *A47J 37/0807* (2013.01)

(58) Field of Classification Search
CPC .................................................... A47J 37/0807
USPC ............... 99/293, 295, 300, 327, 328, 329 P, 99/329 R, 339, 385, 389, 391, 400; 219/492; 426/431, 433
See application file for complete search history.

(56) References Cited

U.S. PATENT DOCUMENTS

| | | | | |
|---|---|---|---|---|
| 1,596,081 | A * | 8/1926 | Coleman | 99/338 |
| 2,301,070 | A * | 11/1942 | Myers | 99/329 R |
| 2,309,640 | A * | 1/1943 | Gough | 99/327 |
| 2,368,026 | A * | 1/1945 | Jepson | 99/389 |
| 2,368,440 | A * | 1/1945 | Barker | 99/339 |
| 2,412,727 | A * | 12/1946 | Ireland et al. | 219/491 |
| 2,477,814 | A * | 8/1949 | MacDonald | 99/395 |
| 2,771,022 | A * | 11/1956 | Hollister | 99/329 R |
| 2,806,422 | A * | 9/1957 | Koci | 99/331 |
| 2,878,748 | A * | 3/1959 | Stanek | 99/328 |
| 2,887,039 | A * | 5/1959 | Bacon | 99/328 |
| 3,014,419 | A * | 12/1961 | Knapp | 99/327 |
| 4,188,867 | A * | 2/1980 | DeRemer | 99/385 |
| 4,889,042 | A * | 12/1989 | Hantz et al. | 99/340 |
| 5,746,116 | A * | 5/1998 | Smith | 99/386 |
| 6,116,150 | A * | 9/2000 | Greenfield, Jr. | 99/332 |
| 6,584,889 | B2 * | 7/2003 | Friel, Sr. | 99/327 |
| 7,238,921 | B2 * | 7/2007 | Beesley et al. | 219/386 |
| 7,853,128 | B2 * | 12/2010 | Cavada et al. | 392/416 |
| 2001/0050277 | A1 * | 12/2001 | Friel, Sr. | 219/412 |
| 2006/0162573 | A1 * | 7/2006 | Yip | 99/389 |
| 2008/0044167 | A1 * | 2/2008 | Cavada et al. | 392/416 |
| 2012/0097044 | A1 * | 4/2012 | Choi | 99/327 |
| 2012/0156344 | A1 * | 6/2012 | Studor et al. | 426/433 |

* cited by examiner

*Primary Examiner* — Jianying Atkisson
(74) *Attorney, Agent, or Firm* — Donn K. Harms

(57) ABSTRACT

A toaster having a body portion engageable over a housing with slots sized for bread passage therethrough aligned with cavities on said house sized to accommodate the bread for toasting. Individually controlled heating elements on each side of each cavity to allow users to independently control the amount of toasting of each side of each inserted piece of bread. The exterior of the body is preferably porcelain to provide resistance to heat transference to the body of the user and to provide a plurality of colors available for the housings.

14 Claims, 3 Drawing Sheets

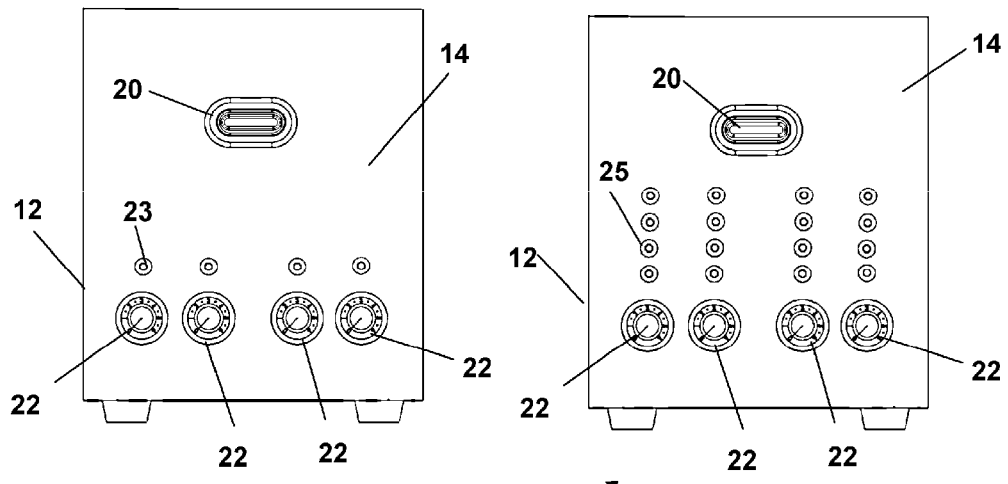
FIG. 4
FIG. 5
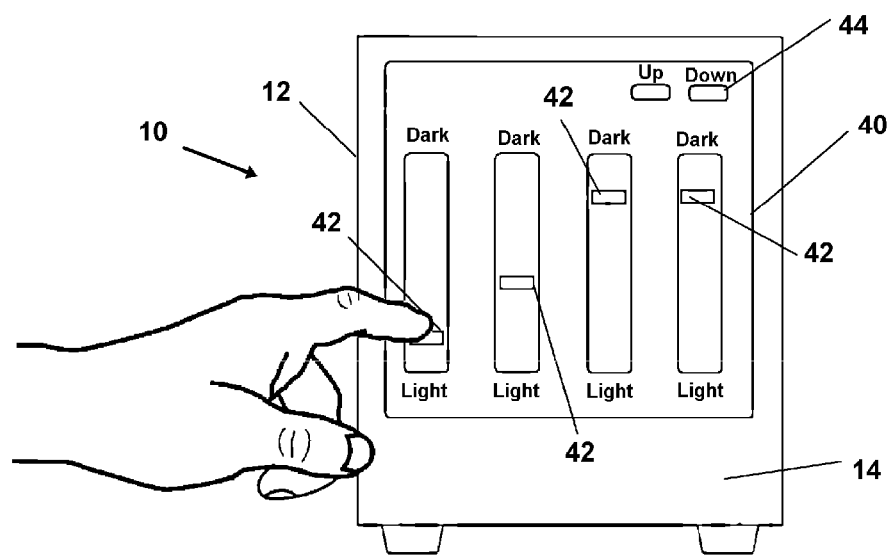
FIG. 6

TOASTER WITH INDEPENDENTLY CONTROLLABLE HEATING ELEMENTS

This application claims priority to U.S. Provisional Patent Application No. 61/630,379 filed on Dec. 12, 2011, and is incorporated herein in its entirety.

BACKGROUND OF THE INVENTION

1. Field of the Invention

The present invention relates generally to toasters employed to toast bread and the like. More particularly, the invention relates to a toaster device employing a plurality of heating elements which each configure to allow independent control by the user. The device allows the user to selectively choose different heating and toasting characteristics for each of a plurality of bread slices inserted. Thereby allowing the user to adjust the heating characteristics for each side surface of the bread as well as portions thereof.

2. Prior Art

Bread has been a staple of the human diet for centuries and toasted or warmed bread has been a popular mode of preparing bread products for consumption. Since the advent of the electric pop-up toaster, the ability and convenience to quickly and effectively toast bread products has been brought to nearly every kitchen counter top in the U.S. and around the world.

Despite the modern revolution in electronic products and their manufacture, the manner in which a toaster operates however, has remained relatively unchanged in the many decades since its conception. Conventionally, a toaster comprises a exterior shell or body having slots, or in some cases doors, adapted for receiving slices of bread or bread products. Contained within the shell is an internal housing comprising a plurality of heating elements surrounding cavities configured to surround inserted bread products. During toasting or warming of inserted bread products, the heating elements are electrified and thereby heated, and subsequently cooled once inserted bread is finished warming or toasting. The heating cycle wherein the heating elements are electrified is generally determined by a timer or heat sensor in a fashion allowing the quick toasting of the exterior side surfaces of the bread slices or inserted bread products such as a bagel.

Toasting adjustments which result in more or less cooking of the bread surfaces, are typically provided by employment of a switch varying the power input to the heating elements, or varying the time in which the slice of bread is exposed to the adjacent heated heating elements. Thus, a longer period of time adjacent a heated element, results in a darker toasted surface of the inserted bread.

However, different manufacturers of toasters are known to employ heating elements which draw different wattage and therefor achieve different temperatures as well as the rate of heating and cooling of the elements. This makes it difficult for average users to determine a toasting cycle time and element heat, which produces perfectly toasted bread.

Further, different types of bread products such as sliced bread, bagels, English muffins, and the like, often require different toasting times due to larger or smaller surface areas and internal areas. Such differences must be accounted for by the user when selecting the proper toast cycle. Bagels, in particular, are difficult to toast in conventional toasters due their shape, and the fact that there is a hole in the center and because some users prefer the open area of the sliced bagel toasted and the curved skin area untoasted, whereas other user prefer both sides of a bagel half toasted.

Users must take all of these variables into consideration on conventional toasters which generally energize the heating elements on both sides of a bread surrounding slot. In making their choice, users generally use a single control which employs toasting indicia, such as bread colors, and dial in the desired bread surface color of their resulting toast. As such, what frequently results, is a slice of bread or bread product, which is under toasted, unevenly toasted, over toasted (burnt), or has two sides toasted where a single side was desired.

The conventional two-slice toasters in use today commonly employ only three heating elements positioned on opposite sides of two slots sized for inserted bread products of choice. The two exterior elements are single sided mica boards or similar material with rows of nickel chromium resistance wire wrapped such that it is primarily on one side of the mica board facing the slot.

A middle or third element employs nickel chromium resistance wire wrapped on both sides in order to provide heat to the opposite sides of both slots of the exterior elements.

Although the shared central heating element serving one side of both bread slots reduces the amount of electricity which is needed for heating the toaster, uneven toasting on at least one side of the bread slice is often a result. Further, because both sides of both bread slots are heated by the radiating heat elements, the user has little choice in the eventual outcome of the toasted bread, other than guessing an appropriate indicia color to choose adjacent to an adjusting dial.

This problem of uneven heating and toasting, and the toasting of bread side surface which are not desired, and the over toasting of one bread side surface and the under toasting of the other surface continue under the present art.

As a result, there is a continuing unmet need for an electric toaster device for bread products, which provides a means for independently controlling each of a plurality of heating elements, positioned adjacent to each of a respective side of a slot adapted for bread insertion. Such a device should be configured to allow the user to selectively choose the amount of toasting or warming each individual side surface of each bread slice or other food item inserted in the toaster. Such a toasting device in addition to providing means for individual adjustment of the elements for toasting, should provide visual feedback as to each adjustment component which is clearly discernable for resulting toasting, to allow the user to easily choose and discern a correct choice for toasting of each bread surface.

The forgoing examples of related art and limitations related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in prior art and achieves the above noted goals through the provision of a toaster device providing a means for independent controlling of a plurality of heating elements for selectively and variably toasting or warming each individual side of a bread slice or other item inserted in the toaster.

In accordance with a first preferred mode, the device comprises an engageable outer shell body, having one or a plurality of apertures therein. The apertures are positioned for a registered inline positioning with receiving cavities formed in an engageable internal housing, those slots being dimensioned to accommodate the insertion of a desired bread product therein.

The internal housing of the device herein, configured to engage the outer shell, is configured for toasting of inserted bread products and includes but is not limited to one or a plurality of bread receiving cavities, a lifting mechanism, and a plurality of heating elements operatively positioned to heat and toast bread surfaces of bread products deposited within the receiving cavity occupied by the heating elements.

Preferably, the number of apertures and receiving cavities is two so as to match the look and operation of conventional toasters to which users are accustomed. Each aperture is sized for translation of the sliced bread product therefore in to the in line receiving cavity sized to receive the inserted sliced bread product therein.

In accordance with this mode of the device, there are preferably two heating elements positioned within each cavity, one each on opposite vertical sidewalls of the formed cavity. So positioned, each respective heating element will be situated adjacent to one side surface of an inserted bread product.

Each heating element is preferably electronically controllable independently of the other respective heating elements to allow for independent communication of electrical current to each heating element. Potentiometers and/or timers engaged to control mechanical or solid state relays and related components will be employed to allow the user control. Such controls thereby provide a means for the user to selectively choose the heating and/or time of heating of each individual heating element and thereby varying toasting or warming each individual side surface, of each piece of other item inserted into a cavity of the toaster.

A means for immediate visual feedback to the user is provided for each individual adjustment made by the user. This visual feedback thereby allows the user to ascertain the resulting final toasting of each surface of each bread slice which will occur due to the adjustment being made by that user, in real time. Such should work to be easily visible and discernable to the user in the sometimes dim light of toasters.

It is noted however, that the number and disposition of the apertures and aligned internal cavities can be modified as deemed suitable by the designer. For example, there can be apertures or slots arranged side by side in the cover which align with internal cavities. Each aperture or slot will be sized to pass through to the internal cavity, a single bread slice. Each receiving internal cavity is dimensioned to position heating elements immediately adjacent to both sides of inserted bread. Each individual heating element is engaged to an adjustable control providing a means for controlling the amount and/or duration of communicated electric current to a respective heating element, to adjust the toasting of adjacent bread surfaces. A visual gauge or means for discerning what an adjustment of each adjustable control is provided to allow the user an easy means to discern the amount of toasting which will result due to the user adjustment of each respective adjustable control.

Alternatively, the toaster device could employ a single elongated slot, sized to receive a plurality of bread slices positioned edge to edge, and having a plurality of independently controlled heating elements also disposed edge to edge corresponding to the positions of each inserted bread slice. Other modifications to the number and size of the internal cavities and slots within the scope and intent of the invention as recognized by one skilled in the art may also be employed.

In accordance with at least one preferred mode, an adjustable control providing the means for independently controlling each of the plurality of heating elements is provided. Instead of a finger engaged control however, the individual adjustable controls are provided by one or a plurality of tactile interface means which use the users touch to communicate and control the electrical energy and/or duration thereof, communicated to each of the plurality of heating elements.

It is noted that the control provided by a tactile interface means can be formed of any suitable user controllable component which may be interfaced with switching for electrical current communicated to a heating element as might be considered by those skilled in the art and shouldn't be considered limited to any one type of interface. For example, and without implying any limitations thereof, the interface means may be one or any suitable combination of digital electronic or mechanical potentiometers, in operative communication with a heating element for controlling temperature or toasting cycles of the heating elements. One such example of a digital interface can be an LCD touch screen on the toaster, or on a communicating electronic device such as a smart phone, and providing the user a graphic user interface, which when employed with software adapted at the task of independently controlling electrical current flow in an operatively engaged switch, will control the timing and/or temperature and resulting toasting cycles of each of the heating elements.

In all preferred modes, it is desired that the device employ means for easily visually ascertaining the toast cycle setting set by the user and a corresponding result for a bread surface from an adjustment of that cycle. For example, a series of vertically disposed lights or LCD's may be employed which sequentially illuminate as a gauge to the user of the resulting intensity of toasting yielded by an adjustment being made. Another example may be a display means, which provides an illuminated display output of the result which will come from the type of toast cycle set by the user, for example the character strings "Light Toast" or "Dark Toast" can be displayed.

The lifting mechanism of the device is preferably electronically controlled by powering an electric motor operatively engaged to translate the lifting mechanism to thereby raise or lower a support surface thereof. Further, electronic or mechanical sensors or other means for discerning complete retraction into a cavity or elevation therein, can be employed to ensure a slice of bread supported by the support surface is properly lowered into the receiving cavity such that the side surfaces of the bread slice will be in registered positions adjacent to one of the heating elements, to obtain optimal evenness when heating or toasting the bread slice or other food item. However, it is noted that non-electrical means for raising and lowering a support surface of the lifting mechanism can also be employed, such as the conventional spring loaded translating apparatus which is depressed by a user to a lowered position.

Further, in accordance with another preferred mode, the shell body of the device is removably engageable from the internal internal housing, providing a means for interchangeability of the exterior shell as deemed suitable by the user. For example, the invention may include a kit of components comprising the internal internal housing, and a plurality of removably engageable shell bodies. Each of the shell bodies may have different colors and/or styles which the user can selectively employ as needed for a suitable design motif. For example, the shell bodies may include different colors, patterns, or shapes which correspond to different interior home designs, holidays, or the like which can be changed as needed to suit a certain decorative motif or time of the year.

Further it is particularly preferred that the shell body of the device is coated or otherwise formed with the exterior surface formed of porcelain or a porcelain enamel layer. This is especially preferred to provide a means for improved thermal insulation to the user from internal temperatures and to prevent burning of their fingers. Additionally, the porcelain provides an insulating layer from accidental communication of electrical current to the user's hand in the event of a short circuit or lightening strike. Finally, the porcelain surface is a rust resistant, stain resistant and durable exterior finish which is preferred in the wet venue of a kitchen. In addition, the porcelain or porcelain enamel exterior layer may be impregnated or otherwise formed with antimicrobial materials, such as silver, silver ions, aluminum ions, or the like. Such will, when employed in a mix as a solid solution of porcelain and additive, yield an antimicrobial surface.

It is known that kitchen counter tops often encounter bacteria and germs due to the handling and preparation of raw or uncooked food. The need to properly clean surfaces and ones own hands after the handling of raw food, especially meats, is stressed by physicians and medical professionals to reduce the risk of spreading germs and bacteria to other surfaces. However, novice home chefs who insufficiently wash their hands after contact with such items, may unknowingly spread such bacteria to kitchen appliances and other surfaces. Therefor such antimicrobial properties can provide a safer and healthier counter-top toaster device in the event of contact with such bacteria.

In addition, it is preferred that the device employs low voltage circuitry for the user interface means which is touched by the user to control the device. This will eliminate the chance of the user getting an electrical shock from the device. A high voltage circuit board is preferably employed with a transformer or voltage step-down to communicate power to the low voltage board, as well as to provide the higher voltage power communication to run the heating elements.

In addition, in one mode of the device which is especially controllable for toasting, at least one heating element may be configured comprising two or four or more, independently controlled inner and outer heating coil portions. When connected to a user control, these provide a means for adjusting individual surface areas of heat applied to each bread surface of a bread slice or other food item inserted into the device. For example, when toasting bagels having a center aperture, a separate inner heating coil element, can be turned to heat to a temperature lower than the outer heating coil portion, since there is no need to heat the aperture of the bagel.

Still further, optionally but preferred, there may be included means for convective heating, provided by an electrically powered fan in communication with the food item receiving cavities in the internal internal housing.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

FIG. 4 shows a side view of a first particularly preferred interface means providing the means for independently controlling temperature and toasting cycles of each of a plurality of heating elements, comprising a plurality of adjustable knobs and indicator lights.

FIG. 5 shows a side view of another particularly preferred interface means providing the means for independently controlling temperature and toasting cycles of each of a plurality of heating elements, comprising a plurality of adjustable knobs and sequential illuminating intensity indicator lights.

FIG. 6 shows a side view of yet another particularly preferred interface means providing the means for independently controlling temperature and toasting cycles of each of a plurality of heating elements, comprising a touch-screen enabled interface with virtual controls which may be graphically moved by contact and sliding of the user's fingers. The plurality of sliding indicators are operatively connected using software and or hardware for controlling the timing and electrical connection of the heating elements to conventional AC power for setting toast cycles of each of the independent heating elements.

Figure 7:
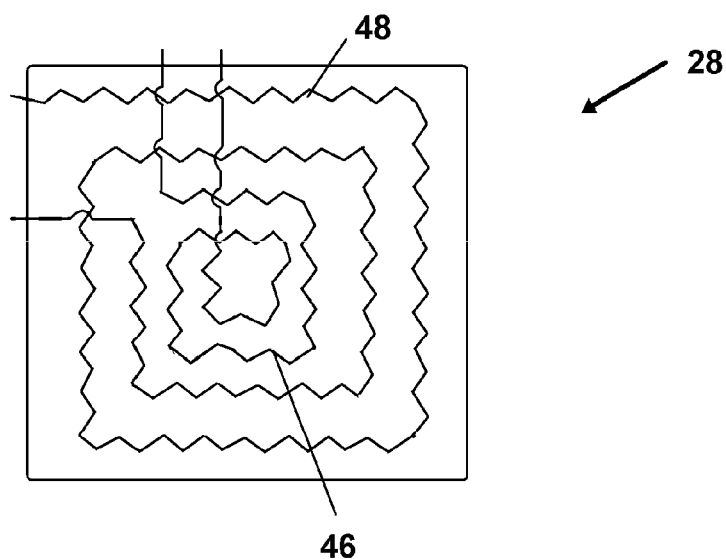

FIG. 7 shows a front view of a particularly preferred mode of a heating element, comprising a plurality of individual heating wires, on the same mica or other board. As shown, independently controllable inner and outer heating coil portions, providing a means for adjusting the surface areas of heat which are communicated to adjacent surface areas of a bread slice or other food item inserted into the device.

Figure 1:
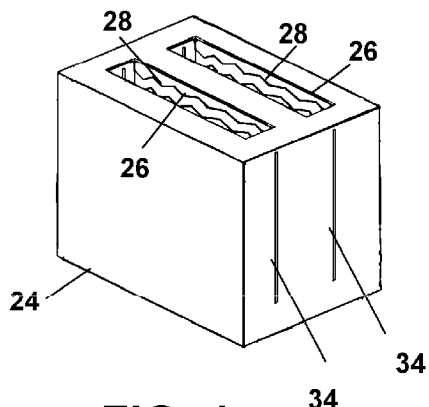
FIG. 1 shows an exploded view of a particularly preferred mode of the toaster device providing a means for independently controlling temperature and toasting cycles of each of a plurality of heating elements, and having a removably engageable outer shell.
Figure 2:
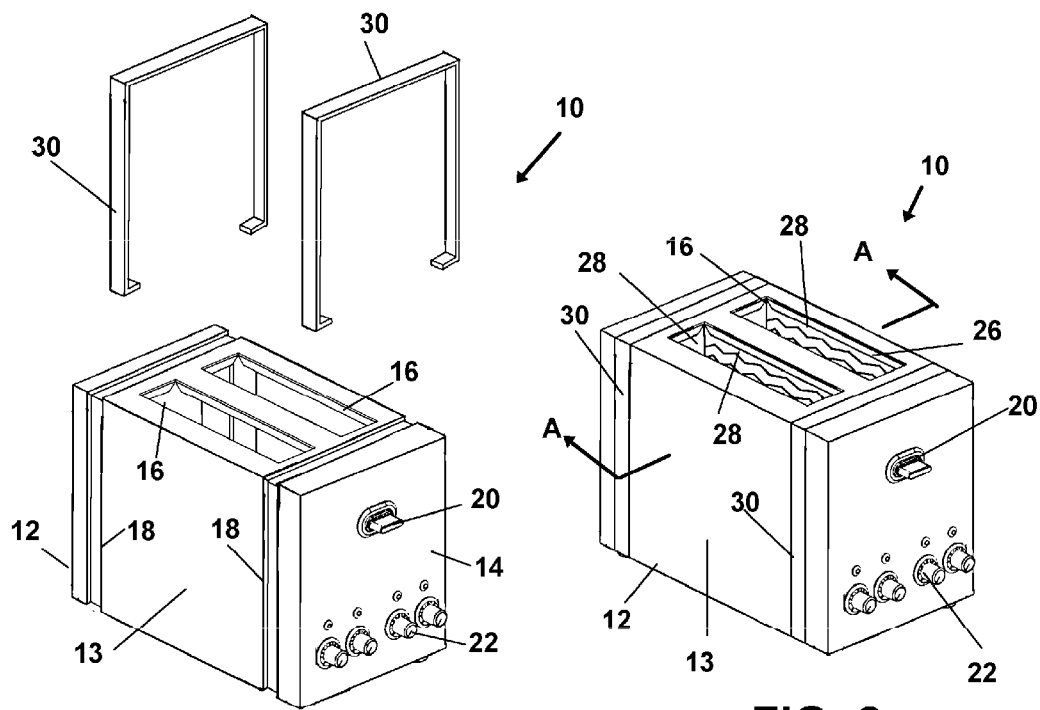
FIG. 2 depicts an assembled view of the mode of the device of FIG. 1.
Figure 8:
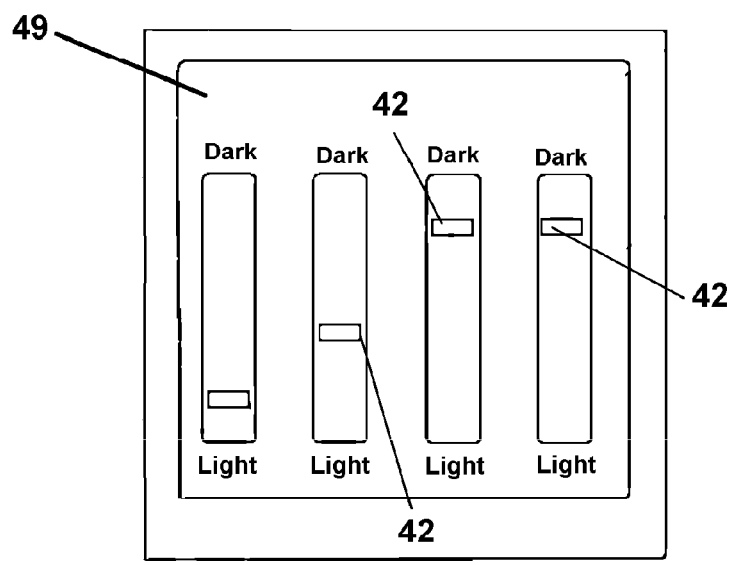

FIG. 8 depicts another mode of a touch screen control such as an LCD screen display graphically depicting the adjusting controls for the elements which may be positioned on the device cover or for instance as an app on a smart phone connected by wireless RF to a communication to the toaster devices of FIGS. 1 and 2.

DETAILED DESCRIPTION OF THE PREFERRED EMBODIMENTS OF THE INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-8, wherein similar components are identified by like reference numerals, there is seen in FIG. 1 an exploded view of a first particularly preferred mode of the toaster device 10 providing a means for independent controlling of a plurality of heating elements 28 for selectively and variably toasting or warming each individual side of a bread slice or other item inserted in the toaster 10. In the current mode, the device 10 comprises an outer shell body 12 configured for a removable engagement over an internal internal housing 24. Removable engagement means are preferably provided by the employment of one or a plurality of engagement bands 30, which are configured to engage within respective channels 18 formed in the exterior surface 13 of the shell body 12 and extend to a secured engagement to the underside of the internal internal housing 24 via removable fasteners such as screws (not shown).

As such a means for interchangeability of the shell body 12 is provided which has been found to be particularly secure when lifting the body to maintain it engaged to the heavier internal housing which is important over the long life of the toaster. However, it is noted that those skilled in the art may recognize other means for removable engagement of the shell body 12 to the internal internal housing 24, however without departing from the scope and intent of the invention, and are therefor anticipated.

Decorators, homeowners, and the like are often known to change decorative styles within their homes to fit different holidays and seasons throughout the year. As such the user can employ the means for interchangeability of the shell body 12 by selectively choosing a body 12 type which is especially well suited for their needs. For example, the invention may be providable or made available to the user as a kit of components comprising the internal toaster component 24, and a plurality of removably engageable shell bodies 12. Each of the shell bodies 12 may have different colors and/or styles which the user can selectively employ as needed for a suitable design motif. The shell bodies 12 may include different colors, patterns, or shapes which correspond to different interior home designs, holidays, or the like which can be changed as needed to suit a certain decorative motif or time of the year.

Further it is particularly preferred that the exterior surface 13 of the shell body 12 of the device 10 is coated or otherwise formed with at least one porcelain enamel layer which provides a means for improved thermal insulation and a stain resistant and durable exterior finish. In addition, the enamel or other suitable exterior layer may be impregnated or otherwise formed with antimicrobial materials, such as silver, silver ions, aluminum ions, or the like. As noted previously, kitchen counter tops often encounter bacteria and germs due to the handling and preparation of raw or uncooked food. In the event that novice home chefs insufficiently wash their hands or bacteria ridden kitchen surfaces, they may unknowingly spread such bacteria to kitchen appliances and other surfaces. Therefor, such antimicrobial properties can provide a safer and healthier counter-top toaster device 10 in the event of contact with such bacteria.

The internal internal housing 24 is preferably comprised of one or a plurality of bread receiving cavities 26, each having independent heating elements 28 disposed on opposite vertical faces of the cavities 26. Slots 16 communicating through the shell body 12 are in registered alignment with the cavities 26 when the shell body 12 is engaged over the housing 24 in an engaged position. Preferably, the number of slots 16 and receiving cavities 26 is two, each of which is sized to receive a single slice of bread or other item.

In accordance with this mode, there are preferably two heating elements 28 employed within each cavity 26, and positioned on opposite vertical sidewalls of the formed cavity 26. Each heating element 28 is substantially planar, and is preferably electronically controlled independently of the others, thereby providing a means for selectively and variably toasting or warming each individual side of a bread slice or other item inserted in the toaster.

Electronic control of high voltage heating elements using low voltage controls is well known in the art and can be employed for example using solid state relays or blue tooth relays. A solid state relay (SSR) is a solid state electronic component that provides a similar function to an electromechanical relay but does not have any moving components, increasing long-term reliability. Every solid-state device has a small voltage drop across it. This voltage drop limits the amount of current a given SSR can handle. The minimum voltage drop for such a relay is a function of the material used to make the device. Solid-state relays rated to handle as much as 1,200 Amperes have become commercially available. Connected to a low voltage control component such as a potentiometer, or a software enabled virtual potentiometer which provides the output signal to control the solid state relay much like the potentiometer, the solid state relay can control the higher voltage and wattage resistive elements of the heating elements 28. Other modes of communicating a low voltage or other electronic signal from a hardware or software control, to a high voltage controller may be employed and are anticipated.

It is also noted, that the number and disposition of the slots 16 can be modified as deemed suitable by the designer. For example, there can be four slots 16 arranged side by side, each sized to receive a single bread slice and each of which employs independently controlled heating elements 28. Alternatively, the toaster device 10 could comprise a single elongated slot 16, sized to receive a plurality of bread slices positioned edge to edge, and having a plurality of independently controlled heating elements 28 also disposed edge to edge corresponding to the positions of each inserted bread slice. Other suitable modifications within the scope and intent of the invention as recognized by one skilled in the art may also be employed.

In accordance with at least one preferred mode, the means for independently controlling the plurality of heating elements is provided by one or a plurality of interface means which electrically communicate with the plurality of heating elements 28. There is preferably low voltage circuitry (not shown) employed for the interface means, to eliminate the chance of the user getting an electrical shock from the device. A high voltage circuit board (not shown) is preferably employed to run the low voltage board, as well as provide power input to the heating elements 28.

In a first preferred mode, shown in FIG. 4, the interface means is provided by one or any suitable combination of a plurality of digital or mechanical potentiometers 22 controlling temperature and/or toasting cycles of the heating elements 28. The potentiometers 22 can be in the form of knobs, as shown. Further, power indicating lights 23 can be provided as a means for visually ascertaining the powering of a toast cycle for a particular heating element 28. The indicating light 23 may be configured to vary in visual light intensity depending on the intensity of the toast cycle selected (i.e. light toast, medium toast, dark toast). In addition, an electrical switch 20 can be provided to activate the lifting mechanism for raising or lowering a food item into the cavity 26 to initiate a toasting cycle.

Figure 3:
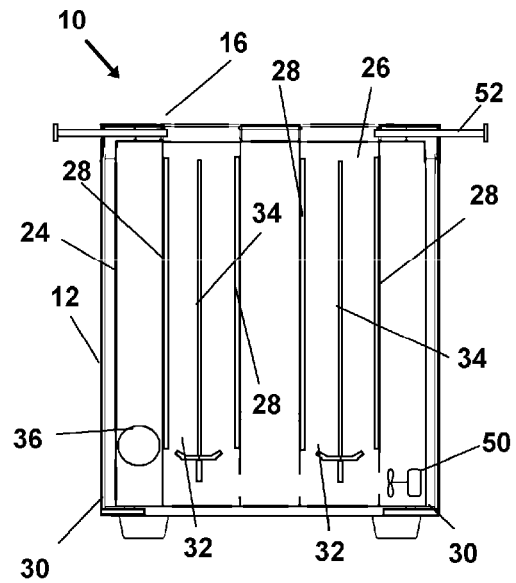
FIG. 3 shows a cross sectional view of the device of FIG. 2, along line AA of FIG. 2, depicting a motor controlled lifting mechanism, and a plurality of independently controlled heating elements.

In FIG. 3, the lifting mechanism of the device 10 is preferably defined by an electric motor 36 which is mechanically engaged to a translatable support surface 32. Means for engagement of the motor 36 to the support surface 32 can be accomplished by any suitable means one skilled in the art may recognize, including but not limited to, a pulley system, or operatively engaged reduction gears.

The support surface 32 is engaged to a vertical track 34 which allows the support surface 32 to raise and lower within the cavity 26. The activation of the switch 20 therefor provides a means for electrically powering the motor 36 for translating the support surface 32 along the track. However, it is noted that non-electrical means for raising and lowering the support surface 32 of the lifting mechanism can also be employed, such as the conventional hand operated and spring loaded means.

FIG. 5 shows yet another particularly preferred mode of the interface means comprising a plurality of digital or mechanical potentiometers 22, and a series of vertically disposed lights 25. The vertically disposed lights 25 are configured to provide a means for visually ascertaining the power of a toast cycle for a particular heating element 28. For example, the lights 25 may sequentially illuminate as the intensity of the toast cycle is increased, by turning the potentiometer 22 accordingly.

FIG. 6 shows still another particularly preferred interface means comprising a touch screen enabled graphic user interface 40 employing software adapted to the task of independently controlling temperature and toasting cycles of each of the independent heating elements 28. The interface 40 may include a plurality of sliding indicators 42 which allow the user to set the toast intensity (i.e. light to dark) of each of the heating elements 28. Additional touch enabled icons 44 can be provided to power the motor 36 for lowering or raising the support surface 32 into the cavities 26 once the settings are set by the user.

FIG. 7 shows a front view of a particularly preferred mode of at least one of the heating elements 28. The currently depicted heating element 28 preferably comprises independently controlled inner 46 and outer 48 heating coil portions defining the substantially planar heating element 28. This mode provides a means for adjusting the surface area of heat applied to bread slice or other food item inserted into the device 10. In modes employing this heating element 28, those skilled in the art will recognize that additional interface means, such as icons, knobs, or switches, may also be included which allows the user to select desired toasting cycles for each of the coil portions 46, 48 of the element 28.

Still further, optionally but preferred, there may be included means for convective heating, provided by an electrically powered fan 50 as shown in FIG. 3. The fan 50 fluidly communicates with the heating cavities 26, such that a powering of the fan 50 will circulate heated air from the heating elements 28 within the cavities 26 for convective heating. Again, those skilled in the art will recognize that additional interface means may be included which allows the user to power the fan 50 as needed for convective heating of food items inserted into the device 10. Further, there may be included means for closing off the apertures 16 of the shell body 12 to reduce heat loss and improve convective heating. This may be provided by one or a plurality of covers 52, which can be communicated over the apertures 16 as needed. The covers 52 may be slidably engaged, and may be translated to a closed position either manually by the user or electronically through an engagement with a motor or electrical actuator, or other suitable means.

FIG. 8 shows a graphic touch screen 49 control such as an LCD screen display engaged with a smartphone, or positioned on the cover 52 and operatively connected using relays and or other conventional electric current controls to lower voltage and control timing to control the heating elements for temperature and/or duration. So positioned the screen would be engaged with a processor running interface software which communicated user touch on the depicted slider controls as a change to mechanical switching controlling the heating elements. Bluetooth or WiFi communication may be employed from a smartphone or remote control to communicate a user's choices made by touching and sliding the controls graphically.

This invention has other applications, potentially, and one skilled in the art could discover these. The explication of the features of this invention does not limit the claims of this application; other applications developed by those skilled in the art will be included in this invention.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A toaster apparatus, comprising:

a body having an exterior surface and an interior surface defining a cavity;

said cavity dimensioned for a positioning of a housing therein in an engaged position of said body with said housing;

means for engagement of said body to said housing;

a pair of receiving cavities positioned on said housing;

a pair of slots communicating through said body;

said pair of slots positioned in said body to align with said pair of receiving cavities when said housing is in said engaged position;

a first heating element and a second electric heating element positioned upon opposing sides of a first of said pair of receiving cavities;

a third heating element and a fourth heating element positioned upon opposing sides of a second of said pair of receiving cavities;

respective individual user-activated controls for controlling heating each of said respective first, second, third, and fourth heating elements, positioned upon said exterior of said body;

each of said user-activated controls operatively electrically engaged to a respective electrical control component which regulates electrical energy communicated to a respective one of said heating elements, from an electrical energy supply;

said means for engagement of said body to said housing is a removable engagement comprising:

a first band having two ends and a second band having two ends;

said first band and said second band having a width sized to engage within a recess formed in said exterior surface of said body;

said two ends of said first band and said two ends of said second band engageable to said housing using fasteners configured to communicate through apertures at each respective end, whereby said body is held in said engaged position by said bands engaged with said recesses and said fasteners engaged to said housing through said apertures; and each said user-activated control adjustably positionable by said user, to regulate said electrical energy communicated to one respective said heating element, between a minimum amount of said electrical energy and a maximum amount of said electrical energy, whereby a user may regulate the toasting of each individual surface of pieces of bread inserted into either or both of said receiving cavities, indecently of all the other respective surfaces of said bread.

2. The toaster apparatus of claim 1 additionally comprising:

said body being from a plurality of said bodies each of said plurality having a different color of said exterior surface; and each said body from said plurality removably engageable with said housing, whereby said toaster can be changed to a chosen color of any one of said plurality of bodies by an engagement of a said body from said plurality of bodies having said chosen color, to said housing.

3. The toaster apparatus of claim 1 additionally comprising:

said exterior surface formed of a layer of porcelain; and said porcelain forming a heat insulator to reduce communication of heat from said elements communicated into said cavity to a portion of the body of said user touching said exterior surface.

4. The toaster apparatus of claim 2 additionally comprising:

said exterior surface formed of a layer of porcelain;

said porcelain colorized to said color of said exterior surface; and said porcelain forming a heat insulator to reduce communication of heat from said elements communicated into said cavity to a portion of the body of said user touching said exterior surface.

5. The toaster apparatus of claim 1 additionally comprising:

said user-activated controls are potentiometers.

6. The toaster apparatus of claim 2 additionally comprising:

said user-activated controls are potentiometers.

7. The toaster apparatus of claim 4 additionally comprising:

said user-activated controls are potentiometers.

8. The toaster apparatus of claim 1 additionally comprising:

said user-activated controls graphically depicted individual controls on a display screen; and movement of any said graphically depicted individual control by contact with a portion of said user's hand, communicating a signal from a microprocessor operatively engaged with said display screen, to a respective said electrical control component.

9. The toaster apparatus of claim 2 additionally comprising:

said user-activated controls graphically depicted individual controls on a display screen; and movement of any said graphically depicted individual control by contact with a portion of said user's hand, communicating a signal from a microprocessor operatively engaged with said display screen, to a respective said electrical control component.

10. The toaster apparatus of claim 4 additionally comprising:

said user-activated controls graphically depicted individual controls on a display screen; and movement of any said graphically depicted individual control by contact with a portion of said user's hand, communicating a signal from a microprocessor operatively engaged with said display screen, to a respective said electrical control component.

11. The toaster apparatus of claim 8 additionally comprising:

said display screen being a component of a smartphone or remote control; and said signal from said microprocessor to said respective said electrical control component being through wireless communication.

12. The toaster apparatus of claim 9 additionally comprising:

said display screen being a component of a smartphone or remote control; and said signal from said microprocessor to said respective said electrical control component being through wireless communication.

13. The toaster apparatus of claim 10 additionally comprising:

said display screen being a component of a smartphone or remote control; and said signal from said microprocessor to said respective said electrical control component being through wireless communication.

14. The toaster apparatus of claim 1 additionally comprising:

said pair of receiving cavities positioned on said housing inline to form a single elongated cavity; and said pair of slots communicating through said body being a single slot having a length substantially equal to said elongated cavity.

\* \* \* \* \*